(12) United States Patent
Magdefrau et al.

(10) Patent No.: US 10,329,432 B2
(45) Date of Patent: Jun. 25, 2019

(54) CORROSION RESISTANT HYDROPHOBIC COATINGS AND METHODS OF PRODUCTION THEREOF

(71) Applicant: United Technologies Corporation, Hartford, CT (US)

(72) Inventors: Neal Magdefrau, Tolland, CT (US); Daniel G. Goberman, East Granby, CT (US); Paul Sheedy, Vernon, CT (US); Aaron T. Nardi, East Granby, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 531 days.

(21) Appl. No.: 14/897,184

(22) PCT Filed: May 29, 2014

(86) PCT No.: PCT/US2014/039940
§ 371 (c)(1),
(2) Date: Dec. 9, 2015

(87) PCT Pub. No.: WO2014/200700
PCT Pub. Date: Dec. 18, 2014

(65) Prior Publication Data
US 2016/0122557 A1    May 5, 2016

Related U.S. Application Data

(60) Provisional application No. 61/834,160, filed on Jun. 12, 2013.

(51) Int. Cl.
*C22C 45/00* (2006.01)
*B29C 49/04* (2006.01)
(Continued)

(52) U.S. Cl.
CPC ............ *C09D 5/1618* (2013.01); *B29C 49/00* (2013.01); *C22C 45/005* (2013.01); *C22C 45/08* (2013.01);
(Continued)

(58) Field of Classification Search
None
See application file for complete search history.

(56) References Cited

U.S. PATENT DOCUMENTS 5,620,537 A    4/1997  Bampton
9,609,874 B1 *  4/2017  El-Eskandarany .... A01N 59/20
(Continued)

FOREIGN PATENT DOCUMENTS

WO    WO2008/052347 A1 *  5/2008

OTHER PUBLICATIONS

A. Inoue, X.M. Wang, W. Zhang. Developments and Applications of Bulk Metallic Glasses, Rev.Adv.Mater.Sci 18 (2008), pp. 1-9.
(Continued)

*Primary Examiner* — George Wyszomierski
(74) *Attorney, Agent, or Firm* — Cantor Colburn LLP

(57) ABSTRACT

A cost-effective method of forming a hydrophobic coating on a substrate and coated substrates are disclosed. Specifically, the method comprises applying amorphous powders of an alloy to the substrate through a cold spray process. Also provided is a novel type of hydrophobic coating made of metallic glasses or amorphous alloys. The hydrophobic coatings offer advantages such as, low cost, low maintenance, and high corrosion resistance.

12 Claims, 2 Drawing Sheets

2(a) Metallic glass coating applied via cold spray; 2(b) Substrate; 2(c) Patterned roller

(51) Int. Cl.

| | |
|---|---|
| *B29C 49/06* | (2006.01) |
| *C23C 24/04* | (2006.01) |
| *C09D 5/16* | (2006.01) |
| *F01D 5/28* | (2006.01) |
| *F01D 25/00* | (2006.01) |
| *C22C 45/08* | (2006.01) |
| *C23C 26/00* | (2006.01) |
| *B29C 49/00* | (2006.01) |
| *B29K 103/06* | (2006.01) |
| *B29C 49/08* | (2006.01) |
| *B29C 49/22* | (2006.01) |
| *B29C 51/00* | (2006.01) |
| *B29L 9/00* | (2006.01) |

(52) U.S. Cl.
CPC .............. *C23C 24/04* (2013.01); *C23C 26/00* (2013.01); *F01D 5/288* (2013.01); *F01D 25/007* (2013.01); *B29C 49/0005* (2013.01); *B29C 49/04* (2013.01); *B29C 49/06* (2013.01); *B29C 49/08* (2013.01); *B29C 49/22* (2013.01); *B29C 51/002* (2013.01); *B29C 2049/001* (2013.01); *B29K 2103/06* (2013.01); *B29L 2009/003* (2013.01); *B29L 2009/008* (2013.01); *F05D 2220/36* (2013.01); *F05D 2300/512* (2013.01)

(56) References Cited

U.S. PATENT DOCUMENTS

| | | | |
|---|---|---|---|
| 9,890,460 B2* | 2/2018 | Klecka et al. | C23C 24/04 |
| 2006/0166020 A1 | 7/2006 | Raybould et al. | |
| 2007/0144621 A1* | 6/2007 | Farmer | C23C 45/00 |
| | | | 148/403 |
| 2008/0261029 A1 | 10/2008 | Andersson | |
| 2009/0236017 A1 | 9/2009 | Johnson et al. | |
| 2010/0004373 A1 | 1/2010 | Zhu et al. | |
| 2010/0098967 A1* | 4/2010 | Schroers | C23C 45/00 |
| | | | 428/600 |
| 2010/0279023 A1* | 11/2010 | Kusinski | C23C 4/08 |
| | | | 427/455 |
| 2011/0111213 A1 | 5/2011 | Es-Souni | |
| 2011/0287223 A1 | 11/2011 | Victor et al. | |

OTHER PUBLICATIONS

J. Schroers and N. Paton. Amorphous Metal Alloys Form Like Plastics, Advanced Materials and Processes, Jan. 2006, pp. 61-63.
Nakajima, Akira. Design of hydrophopic surfaces for liquid droplet control, NPG Asia Mater. vol. 3 (May 2011), pp. 49-56.
Schroers, Jan. JOM, May 2005, pp. 35-39.
European Search Report for European Application No. 14811626.2 dated Oct. 27, 2016, 6 pages.
International Search Report for International Application No. PCT/US2014/039940, dated Sep. 24, 2014.

* cited by examiner

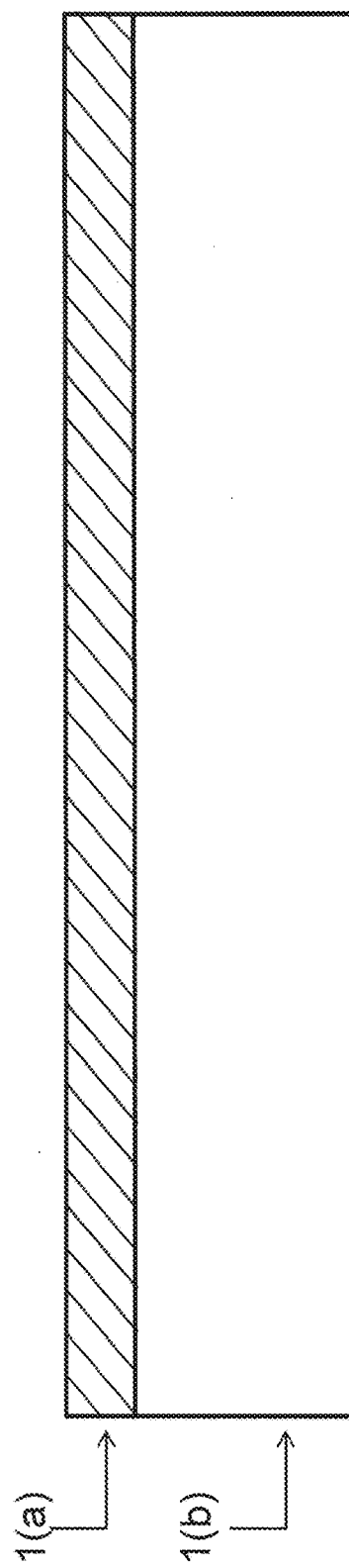
Figure 1: 1(a) Metallic glass coating applied via cold spray; 1(b) Substrate

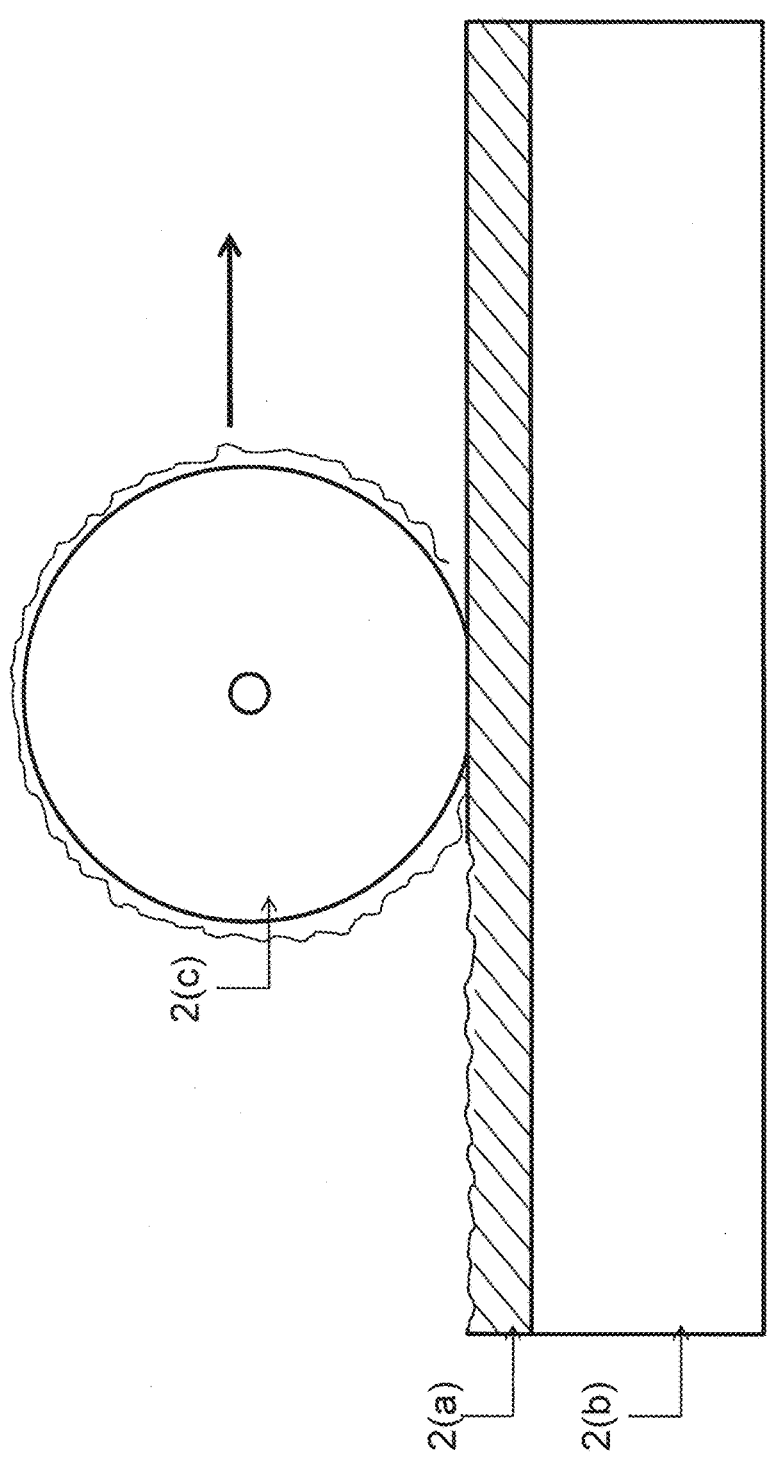
Figure 2: 2(a) Metallic glass coating applied via cold spray; 2(b) Substrate; 2(c) Patterned roller

CORROSION RESISTANT HYDROPHOBIC COATINGS AND METHODS OF PRODUCTION THEREOF

RELATED APPLICATIONS

This application claims the benefit of and priority to U.S. Provisional Patent Application No. 61/834,160 filed Jun. 12, 2013, the contents of which are incorporated herein by reference.

BACKGROUND

Hydrophobic coatings, including those for aerospace applications, are generally made of polymeric materials which break down and/or degrade over time. The polymeric coatings generally only last for a short period of time. This leads to the necessity to constantly monitor and/or replace the coatings. Thus, it is costly and troublesome in maintaining the aerospace equipment.

There is a need for the development of new types of hydrophobic coatings that are low cost, highly corrosion resistant, and easy to maintain. It is also desirable to have a cost effective way of forming the hydrophobic coatings on a substrate (e.g., tools, equipment, and machinery).

SUMMARY

There is disclosed herein a novel method of forming a hydrophobic coating on a substrate. The method includes steps of applying amorphous powders of an alloy to the substrate through a low temperature process, such as a cold spray process; and obtaining an amorphous coating on the substrate. During the cold spray process, the parameters are controlled to avoid temperatures exceeding the crystallization temperature of the alloy.

In certain embodiments, the method comprises heating the amorphous coating to a temperature regime where at least a portion of the amorphous coating is superplasticly deformable; and patterning, processing, or molding the coating to obtain nano-micro- and/or macroscopic features on the surface, which offer hydrophobic effects.

There are also disclosed novel types of hydrophobic coatings. The hydrophobic coatings provided herein are made of metallic glasses or amorphous alloys. These hydrophobic coatings are low cost and corrosion resistant, and especially useful as coatings for machinery components including gas turbine engine components and other equipment susceptible to corrosion in service. If used in industrial settings, the hydrophobic coatings could reduce the need for polymeric coatings across the industry. The hydrophobic coatings could also help to eliminate the need for titanium in various industrial applications, such as the leading edge of a fan blade.

Accordingly, also disclosed are machinery, instruments, equipment, and tools that contain the hydrophobic coating.

BRIEF DESCRIPTION OF THE DRAWINGS

FIG. 1 schematically shows metallic glass coating 1(a) applied via cold spray on substrate 1(b).

FIG. 2. Schematically shows metallic glass coating 2(a) applied via cold spray on substrate 2(b) and patterning on the surface 2(c)

DETAILED DESCRIPTION

Amorphous metal (also known as metallic glass) is a solid metallic material, usually an alloy, with a disordered atomic-scale structure. They are basically frozen liquids with amorphous atomic structure formed through bypassing crystallization during solidification (J. Schroers and N. Paton, *Advanced Materials and Processes*, January 2006, 61-63). The amorphous structure is defined as having a well-defined short range atomic ordering, but lacking a long-range ordering.

The lowest rate by which crystallization can be avoided is called the critical cooling rate, which further correlates to the critical casting thickness, which is defined as the largest thickness a melt can be cast in an amorphous state (J. Schroers and N. Paton, *Advanced Materials and Processes*, January 2006, 61-63).

Recently, a number of alloys known as bulk metallic glasses (BMG) have been produced with critical cooling rates low enough to allow for retention of the amorphous structure in thick layers (over 1 millimeter). The glass-forming ability of metallic alloys is significantly enhanced by increasing the number of alloy components based on three-component rules for bulk glass formation (A. Inoue, X. M. Wang, W. Zhang, *Rev. Adv. Mater. Sci.* 18(2008), 1-9). A number of alloy systems exhibiting these characteristics have been discovered, which include, for example, Zr, Pd, Pt, Mg, La, Fe, Co, Ni, Al, and Cu-based alloy materials.

Amorphous metals are non-crystalline, and have a glass-like structure. Unlike traditional glasses, amorphous metals usually have good electrical conductivity. Further, the absence of grain boundaries and crystalline defects in amorphous metals results in a large elastic strain limit and very high yield strength (J. Schroers and N. Paton, *Advanced Materials and Processes*, January 2006, 61-63). Amorphous metals generally offer high glass-forming ability, good castability, good printability, and other unique characteristics, which can be widely applied in fields including those where conventional alloys cannot be used (A. Inoue, X. M. Wang, W. Zhang, *Rev. Adv. Mater. Sci.* 18(2008), 1-9).

There are several ways in which amorphous metals can be produced, including but not limited to, extremely rapid cooling via melt spinning or gas atomoziation, physical vapor deposition, solid-state reaction, ion irradiation, and mechanical alloying.

In one aspect, a novel method forms a hydrophobic coating on a substrate. Specifically, the method includes the use of amorphous metals. The method comprises the following steps: 1) applying amorphous powders of an alloy to the substrate through a low temperature application process, such as a cold spray process; and 2) obtaining an amorphous coating on the substrate. During the cold spray process, process parameters are controlled such that the temperatures of the powder or resultant coating do not exceed the crystallization temperature of the alloy at any point in the process.

The cold spray process parameters controlled include, process pressure, temperature, nozzle type, feedstock feed rate, nozzle to working piece distance, etc. Through control of these parameters, it is possible to maintain the feed stock temperature within a range suitable to both plastically or superplastically deform the feed stock materials to form the coating, while also maintaining the amorphous or glassy character in the resultant coating. As materials typically become more plastic at higher temperatures, it is generally desirable to maintain the maximum particle temperature below the crystallization temperature of the material to prevent crystal growth in the microstructure. However, in certain cases, a small volume fraction of discontinuous crystal growth ranging from about 0 to 30 volume fraction may be acceptable for an application. Parameters for the cold spray process depend on specific alloy materials that are used, the particle size of the alloy powders, the desired coating microstructure, etc.

Typical application conditions include gas and feed stock temperatures of between about 200° C. to 1000° C., and gas pressures of about 10 to 50 bar.

During the cold spray process, the alloy powders are entrained in a gas at the prescribed temperature then cooled as they pass through the expanding nozzle until the powders impact the substrate at a temperature generally between room temperature (RT) and 300° C. It is also noted that the impacting temperatures may be lower than RT or higher than 300° C., depending on the exact selected operating conditions.

The cold spraying process allows coating materials to be applied at relatively low temperatures. By using this technique, crystallization of amorphous metals can be avoided. In addition, the other metallic glass systems having high critical cooling rates (~$10^{6°}$ C./sec) can be deposited to build up a bulk amorphous coating. In addition to using bulk metallic glass forming systems, this process allows us to use of other metallic glass systems which have cooling rates which are higher (~$10^{6°}$ C./sec). These powders can be made by rapid solidification such as gas atomization and then sprayed to form a "bulk" material which has a thickness that exceeds the critical casting thickness of the starting material. In other words, the cold spray can be used as a consolidation method. Amorphous alloy powders can be made by rapid solidification, for example, gas atomization, and then sprayed to form a bulk material having a thickness over the critical casting thickness of the starting materials. The cold spray process is an inexpensive and efficient way of depositing line-of-site coatings for many different applications. Through the cold spraying process, the coating materials can be rapidly applied onto the substrate.

In certain embodiments, the parameters of the cold spray process are adjusted to have a gas pressure at about 15 to 30 bars. In other embodiments, the parameters of the cold spray process are controlled to have the operating temperatures of about 100° C. to 500° C.

Liquid-glass transition (or "glass transition") is a second order phase transformation which is distinguished by a discontinuity in the specific heat capacity vs. temperature plot and can be measured using Differential Scanning calorimetry (DSC).

In certain embodiments, the method of the invention further comprises a step of heating the amorphous coating to a superplastic forming region in the amorphous coating.

The superplastic forming region appears when the temperature of the alloy is between the glass transition and crystallization temperatures of the alloy. This region allows the alloy to be processed and/or molded like a glass or thermoplastic polymer. Typical glass or thermoplastic polymer processing/molding methods include, superplastic forming, blow molding, patterning, calendaring, casting or blowing, extrusion, injection molding, rotational molding, thermoforming, and transfer molding, etc.

In some embodiments, the superplastic forming region in at least a portion of the amorphous coating is patterned to obtain nanoscale and/or microscopic features on the surface. The patterning procedure could be a rolling or forging process, see. e.g., Nakajima, Akira, *Design of hydrophopic surfaces for liquid droplet control*, NPG Asia Mater. Vol. 3, 49-56 (May 2011), which is incorporated by reference herein in its entirety. A rolling process uses a patterned roller which could either be heated or cooled to keep the sample at an appropriate working temperature. By rolling the material, a negative of the pattern on the roller would be imparted on the surface of the coating. Similarly, the same can be done for a forging process in which a starting die would have a patterned surface and the pattern would be forged or stamped into the coating surface at the appropriate temperature.

In other embodiments, the method includes net-shape processing of at least a portion of the amorphous coating in the superplastic forming region. Net shape processing is a manufacturing process which creates an object in its finished form without the need for additional finish machining or other actions. This process offers advantages, such as, reduced finishing operations and labor and quicker production, making the process more cost efficient. Examples of net shape processes are the forming of glass bottles or the injection molding of plastics, but this method can also be applied to materials such as superalloys.

In other embodiments, the superplastic forming (SPF) of the amorphous coating can be achieved by processes including, for example, a thermoforming process, a blow molding process, and a vacuum forming process, or a combination thereof. These processes can allow for the formation of large and complex workpieces in one operation. The resulting product could have excellent precision and a fine surface finish, with significantly reduced springback and/or residual stresses in comparison to those encountered during similar processing of crystalline metals.

Superplastic forming (SPF) also decouples the fast cooling and forming normally required to form metallic glasses from a melt process (J. Schroers and N. Paton, *Advanced Materials and Processes*, January 2006, 61-63). The superplastic forming (SPF) method is very similar to techniques used for processing thermoplastics and similar forming pressures and temperatures can be applied (Jan Schroers, J O M, 2005, May, 35 to 39; and J. Schroers and N. Paton, *Advanced Materials and Processes*, January 2006, 61-63). Superplastic forming (SPF) involves forming the heated amorphous alloy in the superplastic forming region (or supercooled liquid region) under applied pressure.

As used herein, the supercooled liquid region is the temperature region in which the amorphous phase first relaxes into a highly viscous super-cooled liquid before it may eventually crystallize.

The SPF method can be conducted isothermally at low rates, thereby reducing internal thermal stresses and porosity in the resulting products (Jan Schroers, J O M, 2005, May, 35 to 39; J. Schroers and N. Paton, *Advanced Materials and Processes*, January 2006, 61-63). During the process, the formability, which is inversely proportional to the viscosity, increases with increasing temperatures. Further, the small effective molecular weight (single atoms), low viscosities and long processing windows during SPF enable precise replication of small features, down to the submicron or nanoscale range (J. Schroers and N. Paton, *Advanced Materials and Processes*, January 2006, 61-63).

In one embodiment, the method includes the step of blow molding the amorphous alloy in the superplastic forming region. There are several types of blow molding used in the industry, including, extrusion blow molding, injection blow molding, and stretch blow molding, or combinations thereof.

The blow molding process usually involves a step of forming a plastic-like material into a parison or preform, followed by clamping the parison/preform into a mold and pumping air into the mold. The air pressure then pushes the amorphous alloy material out to match the mold. Once the material has cooled and hardened the mold opens up and the part is ejected.

According to certain embodiments, the amorphous alloy (or metallic glasses) used in the method is an alloy that is corrosion resistant. Specifically, the amorphous alloy (or metallic glasses) used herein have no or little crystalline defects prior to the blow molding process Exemplified amorphous alloys that can be used herein include, such as, Zr, Pd, Pt, Mg, La, Fe, Co, Ni, Al, and Cu-based materials, or a combination thereof. Amorphous alloys include all the existing bulk glassy alloy systems in the art listed below.

| | | |
|---|---|---|
| Mg—Ln—M | Cu—(Zr, Hf)—Ag | Zr—(Ti, Nb, Pd)—Al—TM |
| Pd—Cu—Ni—P | Co—(Al, Ga)—(P, B, Si) | Cu—(Zr, Hf)—Ti—(Fe, Co, Ni) |
| Pd—Ni—Fe—P | Co—(Zr, Hf, Nb)—B | Ce—Cu—Al—Si—Fe |
| Ti—Ni—Cu—Sn | Ni—(Zr, Hf, Nb)—B | Fe—(Al, Ga)—(P, C, B, Si, Ge) |
| Ca—Cu—Ag—Mg | Ni—(Nb, Cr, Mo)—(P, B) | Fe—(Nb, Mo)—(Al, Ga)—(P, B, Si) |
| Cu—Zr, Cu—Hf | Co—Ta—B | Fe—(Zr, Hf, Nb)—B |
| Cu—(Zr, Hf)—Ti | Ni—Zr—Ti—Sn—Si | Fe—Co—Ln—B |
| Cu—(Zr, Hf)—Ti—(Y, Be) | Ni—(Nb, Ta)—Zr—Ti | Fe—Ga—(Cr, Mo)—(P, C, B) |
| Cu—(Zr, Hf)—Al | Ni—Nb—Sn | Fe—(Nb, Cr, Mo)—(C, B) |
| Cu—(Zr, Hf)—Al—(Ag, Pd) | Ni—Pd—P | Fe—Ga—(P, B) |
| Pt—Cu—Ni—P | Zr—Al—TM | Fe—Si—B—Nb |
| Ti—Cu—(Zr, Hf)—(Co, Ni) | Zr—Ln—Al—TM | Co—Fe—Si—B—Nb |
| Au—Ag—Pd—Cu—Si | Ti—Zr—TM | Co—Fe—Ta—B—Si |
| | Zr—Ti—TM—Be | Fe—(Cr, Mo)—(C, B)—Ln |
| | | Co—(Cr, Mo)—(C, B)—Ln Ln—Al—TM |
| | | Al—RE—TM |

Ln designates a lanthanide metal: La, Ce, Pr, Nd, Pm, SM, Eu Gd, Tb, Dy, Ho, Er, Tm, Yb, and Lu; TM designates a transition metal: Fe, Co, Ni, or Cu; RE designates a rare earth element: Sc, Y, La, Ce, Pr, Nd, Pm, Sm, Eu, Gd, Tb, Dy, Ho, Er, Tm, Yb, Lu.

In certain embodiments, specific amorphous alloys include, such as, Zr—Al—Cu, Pd—Ni—P, Ni—Pd—P, Zr—Al—Ni—Cu, Pd—Cu—Ni—P, Pd—Pt—Cu—P, Pt—Cu—Ni—P, Cu—Zr—Al—Y, Cu—Zr—Al—Ag, Y—Sc—Al—Co, Mg—Cu—Ag—Gd, Zr—Ti—Ni—Cu—Be, Ce—Cu—Al—Si—Fe, Fe—(Cr, Mo)—C—B—Y, Fe—(Cr, Mo)—C—B-TM, Co—(Cr, Mo)—C—B—Y, Co—(Cr, Mo)—C—B-TM, and Fe—Co—(Cr, Mo)—C—B-TM (see, e.g., A. Inoue, X. M. Wang, W. Zhang, *Rev. Adv. Mater. Sci.* 18(2008), 1-9). Some of the best examples are Zr-based alloys, such as Zr—Ti—Cu—Ni—Be alloys which have superplastic forming regions which span over 100° C.

Further provided is a novel type of hydrophobic coating. The hydrophobic coatings described herein are produced by the above-mentioned methods. These hydrophobic coatings are low cost and corrosion resistant. Moreover, the hydrophobic coatings described herein are low maintenance, making them especially useful in the aerospace applications. The hydrophobic coatings could also find their places in various industrial applications where polymeric coatings are currently used. The industrial applications include, for example, the consumer industry, the medical industry, and the aerospace and marine fields.

Accordingly, also provided is a machinery, instrument, equipment, or tool that contains the hydrophobic coating that are above described.

The entire contents of all patents/patent applications and literature references cited herein are hereby expressly incorporated herein in their entireties by reference.

Those skilled in the art will recognize, or be able to ascertain using no more than routine experimentation, numerous equivalents to the specific procedures described herein. Such equivalents are considered to be within the scope of this invention and are covered by the following claims.

We claim:

1. A method of forming a coating on a substrate, comprising
   1) applying an alloy powder to the substrate, which powder is, at least in part, an amorphous alloy powder through a cold spray process;
   2) obtaining a coating on the substrate which is, at least in part, amorphous;
   3) heating the amorphous coating to form a superplastic forming region in at least a portion of said amorphous coating, and
   4) patterning the amorphous coating to obtain nanoscale and/or microscopic features on a surface of said amorphous coating
   wherein the parameters of said cold spray process are controlled so that the temperature occurring during said cold spray process does not exceed the crystallization temperature of said alloy and the coating is a hydrophobic coating and further wherein the patterning step is performed through a rolling process.

2. The method of claim 1, wherein the amorphous coating is heated to a temperature between the glass transition and crystallization temperatures of the alloy.

3. The method of claim 1, wherein the method comprises a process of superplastic forming the amorphous coating.

4. The method of claim 3, wherein said superplastic forming process is a thermoforming process, a blow forming process, or a vacuum forming process, or a combination thereof.

5. The method of claim 4, wherein the superplastic forming process is a blow molding process.

6. The method of claim 5, wherein said blow molding process is an extrusion blow molding process, an injection blow molding process, or a stretch blow molding process, or a combination thereof.

7. The method of claim 1, wherein the method comprises net-shape processing the amorphous coating.

8. The method of claim 1, wherein said alloy is a corrosion resistant alloy.

9. The method of claim 1, wherein said alloy is a material selected from the group of Zr, Pd, Pt, Mg, La, Fe, Co, Ni, Al, and Cu-based materials, or a combination thereof.

10. The method of claim 9, wherein said alloy is an Al-based alloy or Mg-based alloy.

11. The method of claim 1, wherein the parameters of said cold spray process comprise a pressure of about 15 to 30 bars.

12. The method of claim 1, wherein the parameters of said cold spray process comprise an operating temperature at about 100° C. to 500° C.

* * * * *